(12) United States Patent
Sorias

(10) Patent No.: US 8,787,119 B2
(45) Date of Patent: Jul. 22, 2014

(54) WATCH ASSEMBLY WITH A SPARE BATTERY FOR READILY POWERING AN EXTERNAL MOBILE ELECTRONIC DEVICE

(71) Applicant: Yeoshua Sorias, Brooklyn, NY (US)

(72) Inventor: Yeoshua Sorias, Brooklyn, NY (US)

( * ) Notice: Subject to any disclaimer, the term of this patent is extended or adjusted under 35 U.S.C. 154(b) by 0 days.

(21) Appl. No.: 13/915,231

(22) Filed: Jun. 11, 2013

(65) Prior Publication Data

US 2013/0329532 A1  Dec. 12, 2013

Related U.S. Application Data

(60) Provisional application No. 61/658,124, filed on Jun. 11, 2012.

(51) Int. Cl.
*G04C 3/00* (2006.01)
*G04C 10/00* (2006.01)

(52) U.S. Cl.
CPC *G04C 10/00* (2013.01); *Y02E 60/12* (2013.01)
USPC .......................................... 368/204; 368/313

(58) Field of Classification Search
USPC ................ 368/64, 203–205, 10, 14, 309–313
See application file for complete search history.

(56) References Cited

U.S. PATENT DOCUMENTS

| | | | | |
|---|---|---|---|---|
| 5,008,864 | A * | 4/1991 | Yoshitake | 368/10 |
| 5,657,298 | A | 8/1997 | Choay | |
| 6,623,294 | B2 | 9/2003 | Tse et al. | |
| 6,779,917 | B1 * | 8/2004 | Chappuis | 368/282 |
| 6,874,931 | B2 * | 4/2005 | Noirjean et al. | 368/282 |
| 7,027,358 | B1 * | 4/2006 | Esposito et al. | 368/10 |
| 7,280,844 | B2 * | 10/2007 | Ikeda et al. | 455/556.1 |
| 7,345,954 | B2 * | 3/2008 | Ehrsam et al. | 368/10 |
| 7,618,260 | B2 * | 11/2009 | Daniel et al. | 439/37 |
| 2004/0081025 | A1 * | 4/2004 | Chen | 368/10 |
| 2004/0151071 | A1 * | 8/2004 | Kocher | 368/10 |
| 2007/0064542 | A1 * | 3/2007 | Fukushima | 368/282 |
| 2007/0279852 | A1 | 12/2007 | Daniel et al. | |
| 2008/0089182 | A1 * | 4/2008 | Scheybal | 368/10 |
| 2008/0214248 | A1 | 9/2008 | Hensel | |
| 2009/0128090 | A1 | 5/2009 | Bi | |
| 2009/0224722 | A1 | 9/2009 | Causey | |
| 2011/0203954 | A1 | 8/2011 | Kroupa | |
| 2012/0293107 | A1 | 11/2012 | Ajagbe | |

FOREIGN PATENT DOCUMENTS

| | | |
|---|---|---|
| CN | 201054376 | 4/2008 |
| KR | 100926496 | 11/2009 |
| RU | 2295818 | 3/2007 |

OTHER PUBLICATIONS

Watch Batteries—watchbatteries-usa.com; May 2, 2014 (web.archive.org; Apr. 28, 2010).*
Small Battery Company—smallbattery.company.org.uk; May 2, 2014 (web.archive.org; Apr. 15, 2012).*
Search Report issued by European Patent Office on Sep. 26, 2013 in connection with corresponding European application No. PCT/US 2013/045191.

* cited by examiner

*Primary Examiner* — Sean Kayes
(74) *Attorney, Agent, or Firm* — Ostrolenk Faber LLP

(57) ABSTRACT

A watch assembly is provided with a watch housing, a watch movement, a watch display, as well as a special compartment holding a spare battery assembly and a standardized charging plug which enables the watch assembly to be connected to an auxiliary mobile device, such as a telephone, to be temporarily charged via the spare battery. Thus, a telephone can be a mobile device, such as a telephone, can be tethered to the watch assembly and utilize the mobile device while holding it in the palm of his or her hand.

20 Claims, 14 Drawing Sheets

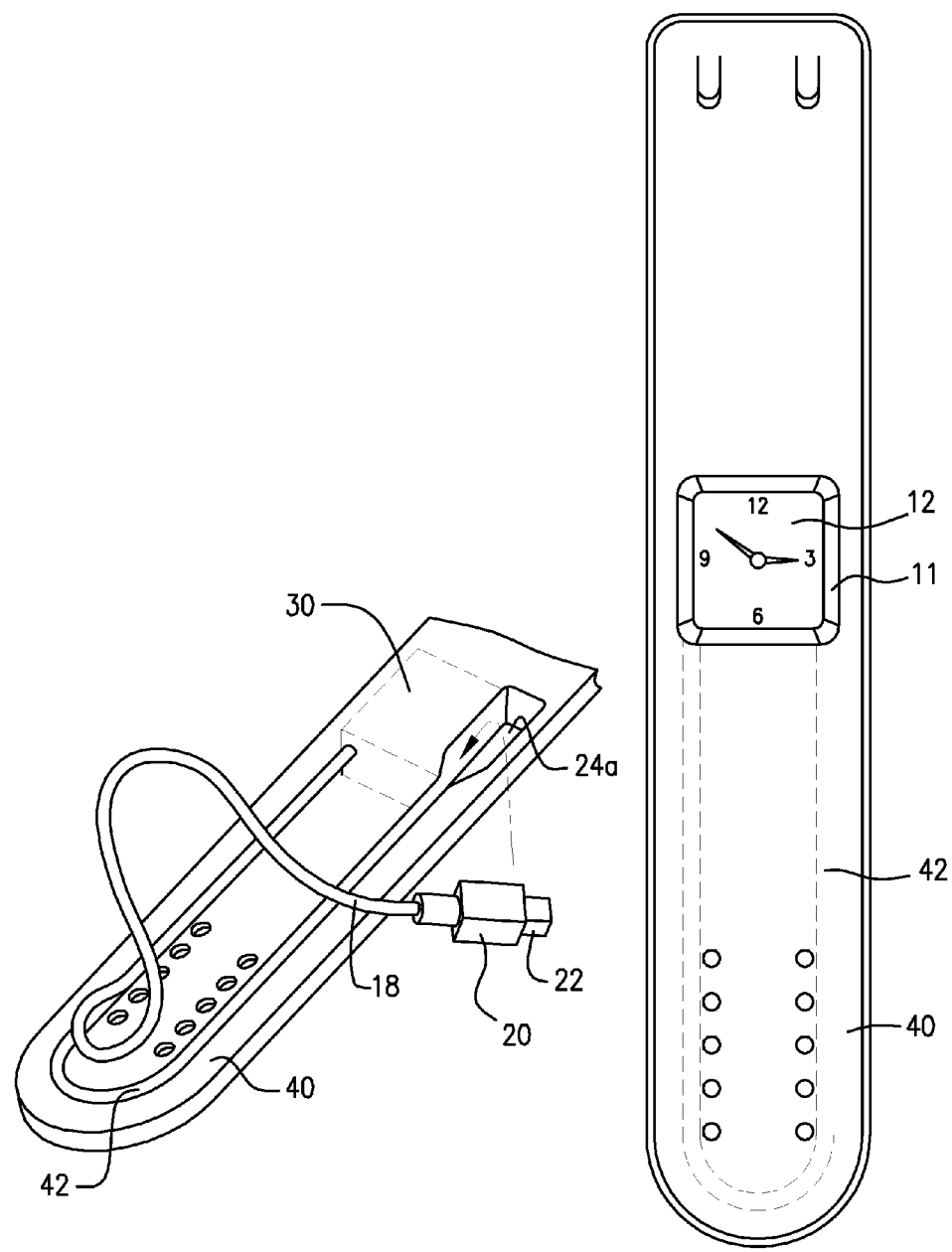

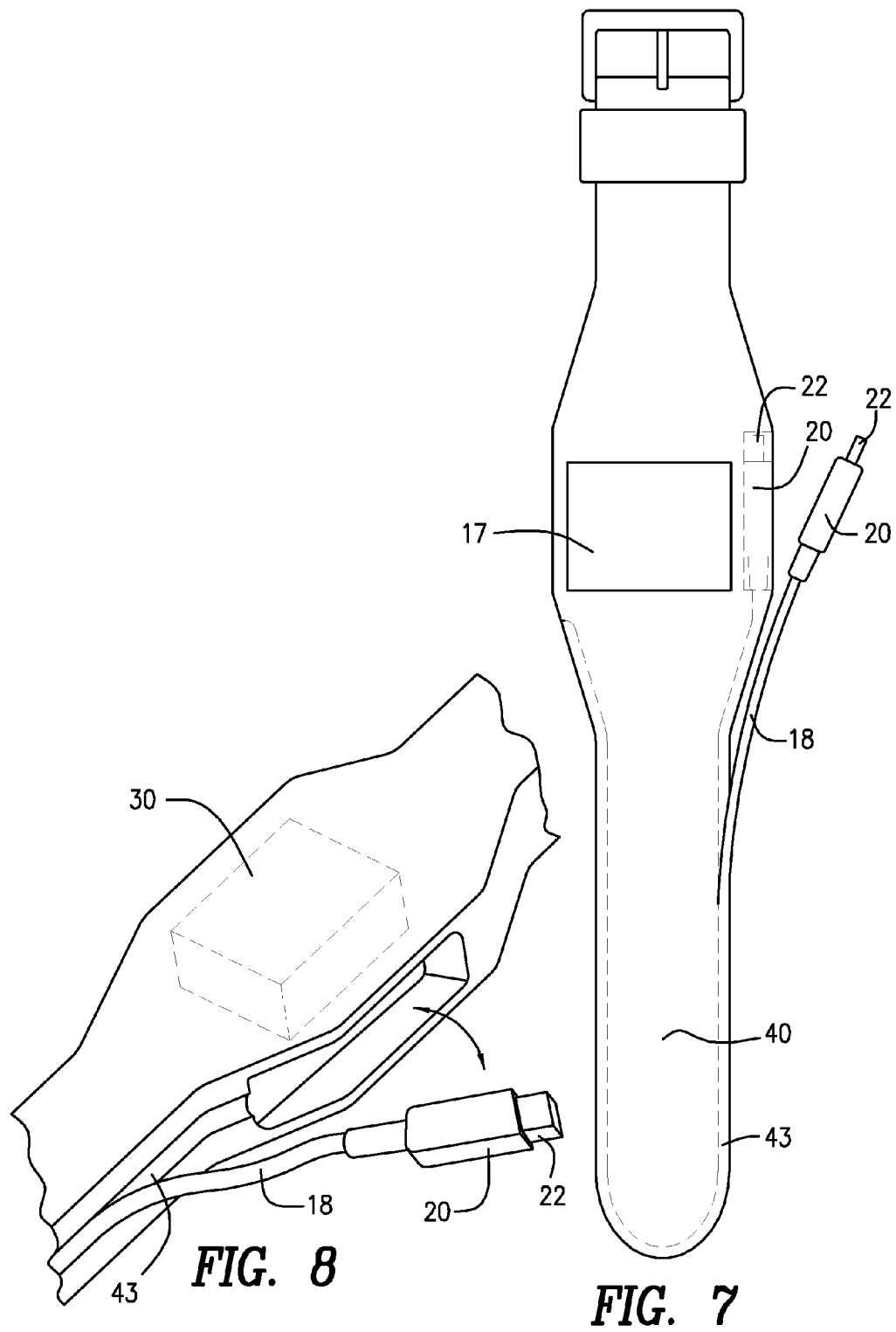

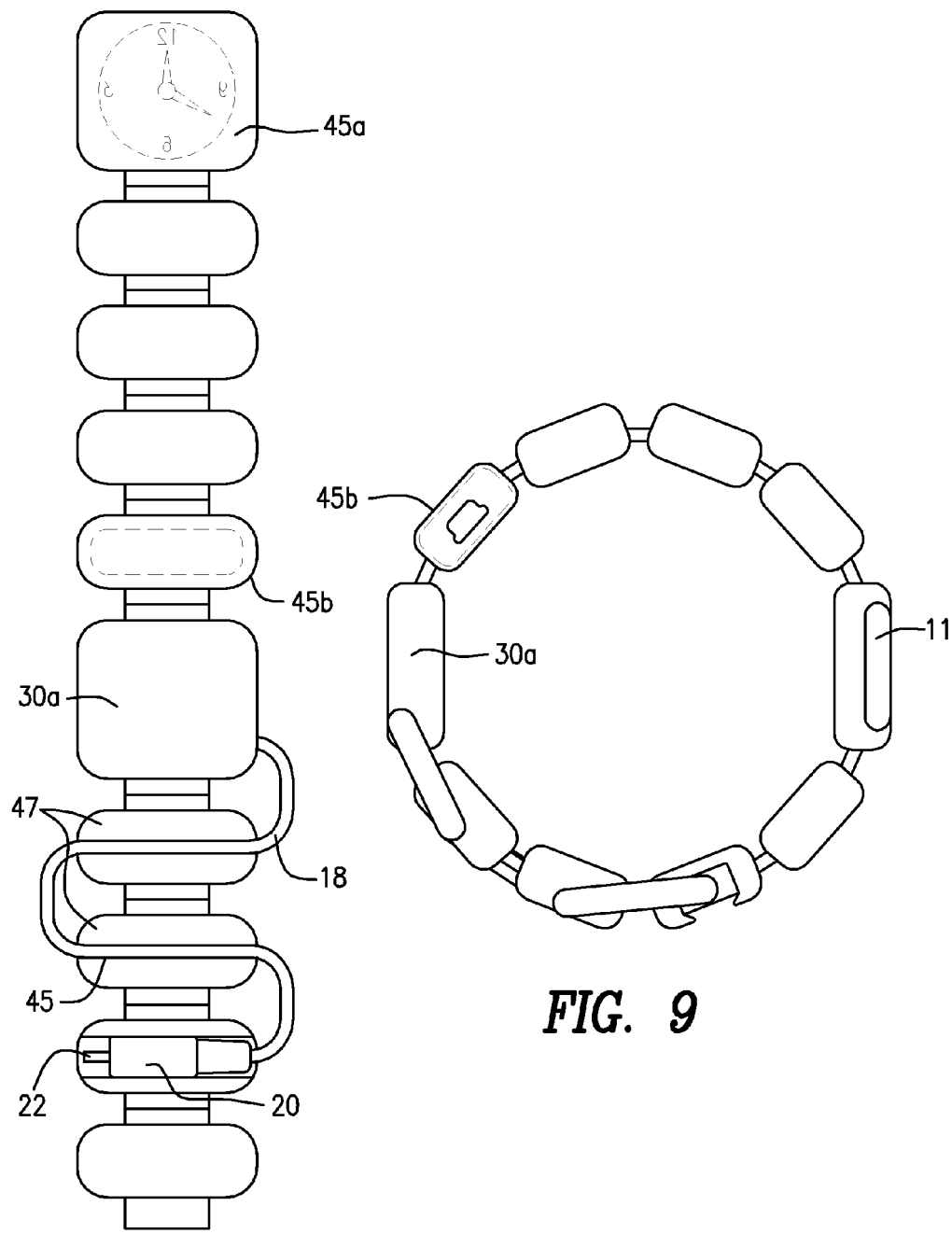

WATCH ASSEMBLY WITH A SPARE BATTERY FOR READILY POWERING AN EXTERNAL MOBILE ELECTRONIC DEVICE

CROSS-REFERENCE TO RELATED APPLICATION

This application claims the benefit and priority of U.S. Provisional patent application Ser. No. 61/658,124, filed Jun. 11, 2012 entitled SPARE, BUILT-IN-WATCH BATTERY FOR MOBILE PHONES, the entire disclosure of which is incorporated herein by reference.

FIELD OF THE INVENTION

The present invention is directed to a spare battery for mobile phones or any electronic device such as the Android®, iOS®, Blackberry® phones, the iPhone®, iPod® tablet and similar phones and devices and, more particularly, to a spare battery which is built into a wrist watch and which is available for operating the mobile phone when it has run out of electrical power, by depleting its onboard battery.

BACKGROUND OF THE INVENTION

All too often, a person finds himself or herself with a mobile phone rendered inoperable by a totally depleted battery, and without any charging device. Also, just noting a low charge level in one's mobile device causes some people anxiety. Even one having a charger loses his or her mobility, if the cellular device has to be tethered to a wall outlet for an extended charging time period. Certainly, walking on the street provides one with no solution at all to a discharged battery.

Prior art devices such as telephone jackets which can be wrapped around a device such as the iPhone® and which house therein, an extra spare battery are known. Still, those devices are large and substantially increase the overall dimension of the cellular device being carried around.

SUMMARY OF THE INVENTION

Accordingly, it is an object of the present invention to provide a spare battery for a mobile device which can be carried about almost without awareness of it.

It is another object of the present invention to provide a watch assembly which includes a housing with a spare battery for a mobile device.

It is a further object of the present invention to provide a watch assembly with a spare battery for a mobile device which is dimensionally small, can be easily carried on one's wrist, and is also light, while providing a sufficient charge for a mobile device for an extended period, sufficient to reach a location where an ordinary cell phone battery charger is available.

It is yet another object of the present invention to provide a watch assembly with a spare battery unit which provides its electrical power through a standardized charging connector of a mobile device, such as the iPhone®, the Android® phones, the iOS MicroSoft mobile phones, and the like.

The foregoing an other objects of the invention are realized with a watch assembly comprising: a watch housing, a watch movement and watch display, the watch housing being configured to hold and support the watch movement; a spare battery assembly physically connected to the watch housing and including therein a rechargeable spare battery able of storing a sufficient electrical charge to run a mobile auxiliary communication device not associated with the watch assembly; and a charging plug connected to and constituting part of the spare battery assembly, the charging plug being configured as a standardized plug which fits a predetermined charging port of the auxiliary mobile device and not being associated or configured to power the watch assembly.

Preferably, the watch assembly also includes a flexible cable that can be stowed either within the watch assembly or in its band. In a further embodiment, a visual or a sound indication is provided when the spare battery itself requires charging. In accordance with another embodiment of the invention, the watch movement and battery assembly are connected to the watch body by hinge mechanism and can be pivoted in and out of a storage space in the watch assembly. Preferably, the battery is a lithium ion battery of a size and charge capacity further in at least 600 mAh hours of charge.

In accordance with the present invention, instead of having to carry around an extra battery or an extra battery charger with its unseemly and tangle prone electrical cord, the present invention provides a spare battery which is incorporated into the housing of a watch and which is worn on one's wrist and always available by being part of the watch. When a mobile phone runs out of electrical power, it can be brought into electrical contact with the battery built into the watch case and operated for an additional period of an hour or several hours.

BRIEF DESCRIPTION OF THE DRAWINGS

FIGS. 5 and 6 show an alternate embodiment for storing the power cable extending from the spare battery.

FIGS. 7 and 8 show a further embodiment for storing the power cable from the charging battery.

FIGS. 9 and 10 show yet another embodiment of storing the power cable.

DETAILED DESCRIPTION OF THE DRAWINGS

Preliminarily and in general, the present invention is directed to a watch case assembly which is intended to be always worn on one's wrist and which houses therein a spare battery which can be used to temporarily power a mobile device, such as a cellular phone, for an extended period of, for example, an hour or even several hours, until one arrives at a location which provides the means and convenience of charging the cell phone in the normal manner.

The watch assembly has an input port for charging the spare battery within and, optionally, an indicator, e.g., an LED or a buzzer that alerts the user when the spare battery has itself lost its charge. The watch case is intended to have an overall appearance that does not detract at all from the aesthetics of the watch, other than adding a few millimeters of thickness to house the spare battery, which is presently available in very thin configurations of 2-4 mm.

The present disclosure incorporates by reference the entire contents, including drawings, of United States Patent Publications 2009/0069045 (entitled Wrist-Watch Mobile Phone, filed Sep. 5, 2008); U.S. Patent Publication 2005/0189906 (entitled Battery Arrangement for Wrist-Carried Device); and U.S. Patent Publication 2004/0209657 (entitled Wrist-Mounted Telephone Device).

Figure 2:
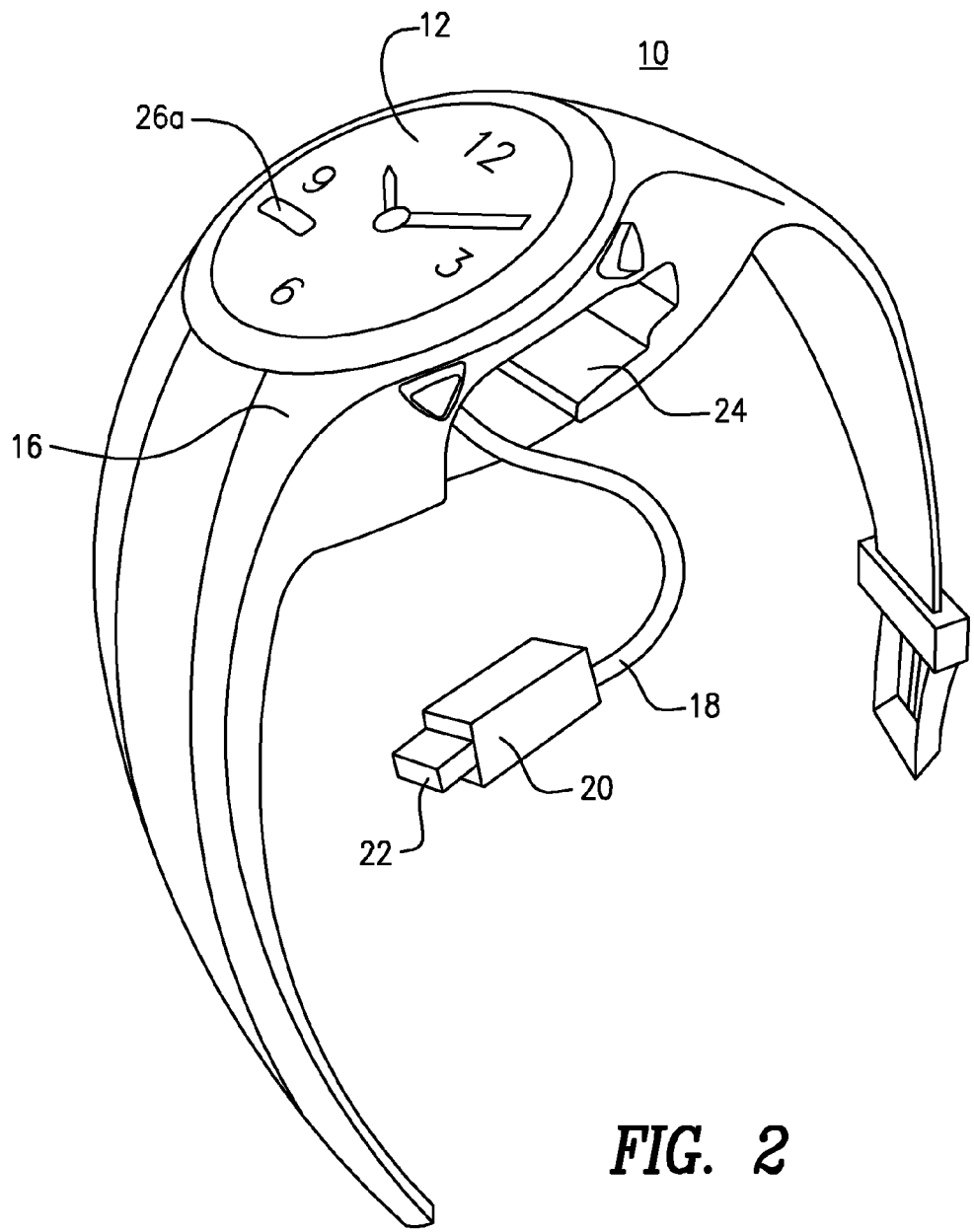
FIG. 2 shows FIG. 1 with the charging plug from the battery removed from its nestling position.
Figure 3:
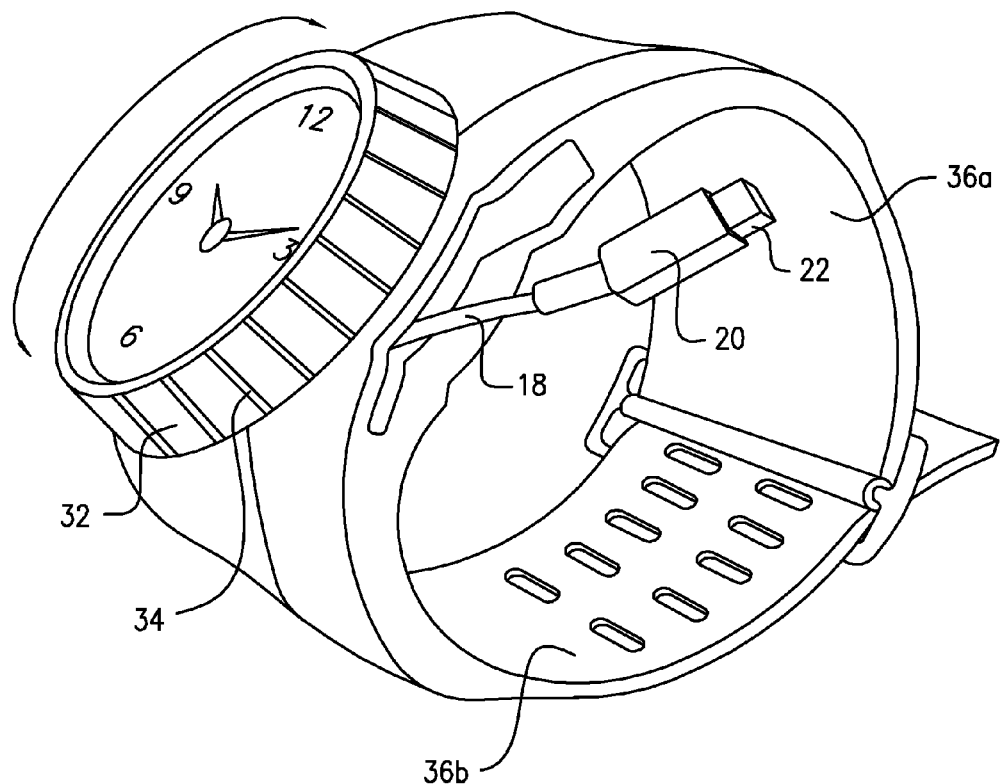
FIG. 3 shows a reeling embodiment for the battery cable.

In FIG. 3 of U.S. Patent Publication 2009/0069045 is shown a wristwatch arrangement with a battery 117 and a charging facility TG1. In FIG. 2 of the aforementioned U.S. Patent Publication 2009/0069045 is shown a compartment in the watchcase. Although the present invention is not intended or designed to include any computing device, the battery storage facility disclosed and shown therein may serve for being used as the spare mobile device battery for the purpose of the present invention, with the necessary modifications to adapt it for charging an external mobile device.

In the same vein, FIG. 5 of U.S. Patent Publication 2005/0189906 shows a watch in which part of the band is formed as a battery housing. As above, that battery can serve the purposes of providing the spare battery for the mobile device herein.

In all of the above prior art embodiments, the battery is directly connected to power either the watch or a cellular device which carried on the wrist and integrally intertwined with the wrist carried device. None of the embodiments provide an externally available charging plug from the battery that can be connected to a independent and standardized charging port of a telephone device such as the iPhone®, the Blackberry®, and the like. The terminology "standardized charging plug" as used herein is intended to be specifically limited to manufacturers' standardized charging plugs for their mobile devices. For example, Apple Corp. has a standardized plug on which it obtained a patent for the particular configuration. The charging plugs of the Blackberry® devices or the Android® phones are similarly standardized. A key aspect of the present invention is that a watch assembly is provided with a spare battery, whose entire or at least substantially entire, purpose is to provide a charging plug that is connectable to an external, unrelated telephone or mobile device.

Figure 1:
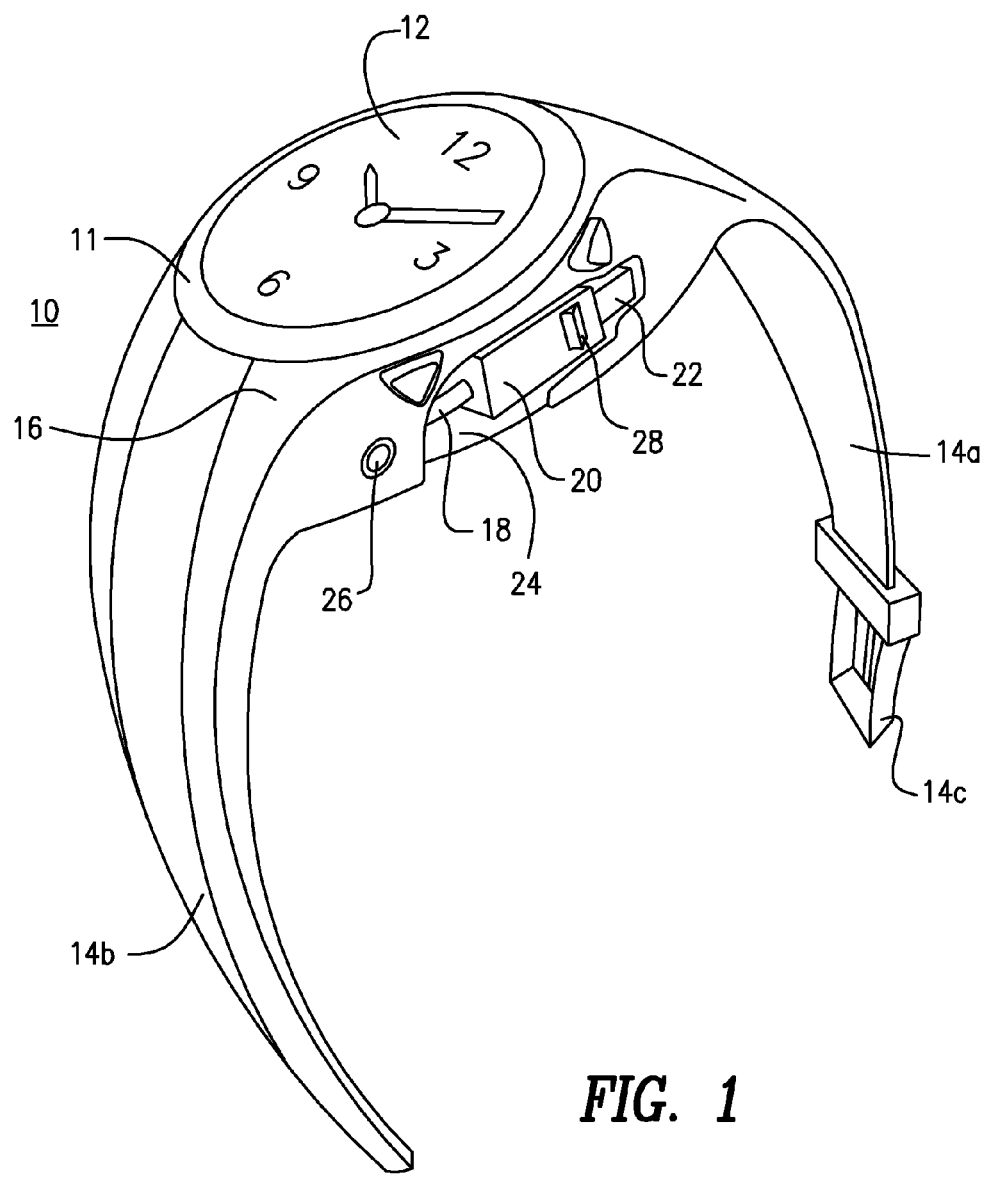
FIG. 1 is a perspective of the watch assembly of the present invention in accordance with one embodiment thereof.

Reference is now made to the drawings, commencing with FIG. 1, which shows respectively, a watch assembly 10, including a watch movement 11, and a watch dial 12. The watch dial may be formed as a digital watch dial. In typical fashion, the watch comprises an armband with components 14a and 14b and a buckle 14c.

Of significance herein, the main watch housing 16 comprises an internal compartment (described later) with a spare battery which provide a DC power that is routed through a flexible, extremely thin cable 18 to a plug body 20 which terminates in a charging plug 22 which has the standardized size and pin format for a particular phone. Thus, the charging plug 22, which is provided with a particular watch embodiment is configured for particular phone. Nonetheless, as described later, it is within the ambit of the present invention to provide a male plug 20 which allows its interchange to provide power to a different standardized mobile telephone device. Thus, the plug body 20 and charging plug 22 can be constructed to be interchangeable. The terminal end of the cable 18, plug body 20 and charging plug 22 are housed in a nestling cavity 24. An indication of low power can be provided through LED indicator 26.

When the watch assembly 10 is worn on one's right hand, the person facing the wearer does not see the plug 20 and nesting cavity 24. In the same vein, the watch assembly 10 can be provided with the plug nestling 24, including the plug charger 22 on the left side of the watch, for those who wear watches on their left hand.

In FIG. 2, the cable 18, plug body 20 and charging plug 22 are shown in the withdrawn position, where a portion of the cable extends out of the watch assembly body 16, for several inches, e.g., 2-8 inches. Also, as shown in FIG. 2, the low charge indicator 26a can be provided on the watch dial 12.

Figure 3A:
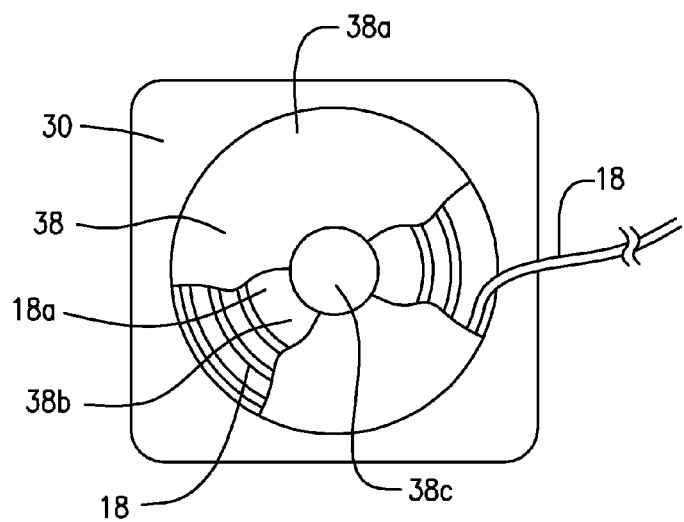
FIG. 3a shows a detail of FIG. 3.

Referring to FIGS. 3 and 3a, internally within the watch body may be provided a reel 38 with an upper wall 38a and a bottom wall 38b and a core 38c defining therebetween an annular space 18a in which the cable 18 can be reeled into or released from. The reel 38 may be provided anywhere within the housing or atop the internal battery 30. The core 38c is mechanically coupled to a knob 32 with projecting ribs 34 which can be grasped to turn it clockwise to reel the cable 18 inside the watch housing. To release it, it is insufficient to simply pull on the plug body 20. Also shown is the band with its components 36a and 36b. Regardless, the cable 18 can extend out of the watch assembly several inches, with a sufficient length so that the charging plug 22 can be inserted into the charging port of the cell phone, which is held in the same hand. Thereby, one can walk on the street with a cell phone connected to the watch by the cable 18 and continue speaking and using the telephone, despite the total discharge of the internal battery of the cell phone. In accordance with an alternative embodiment, the knob 32 can be configured as an outward reel and one can simply wind the flexible cable on the outward reel.

Figure 4:
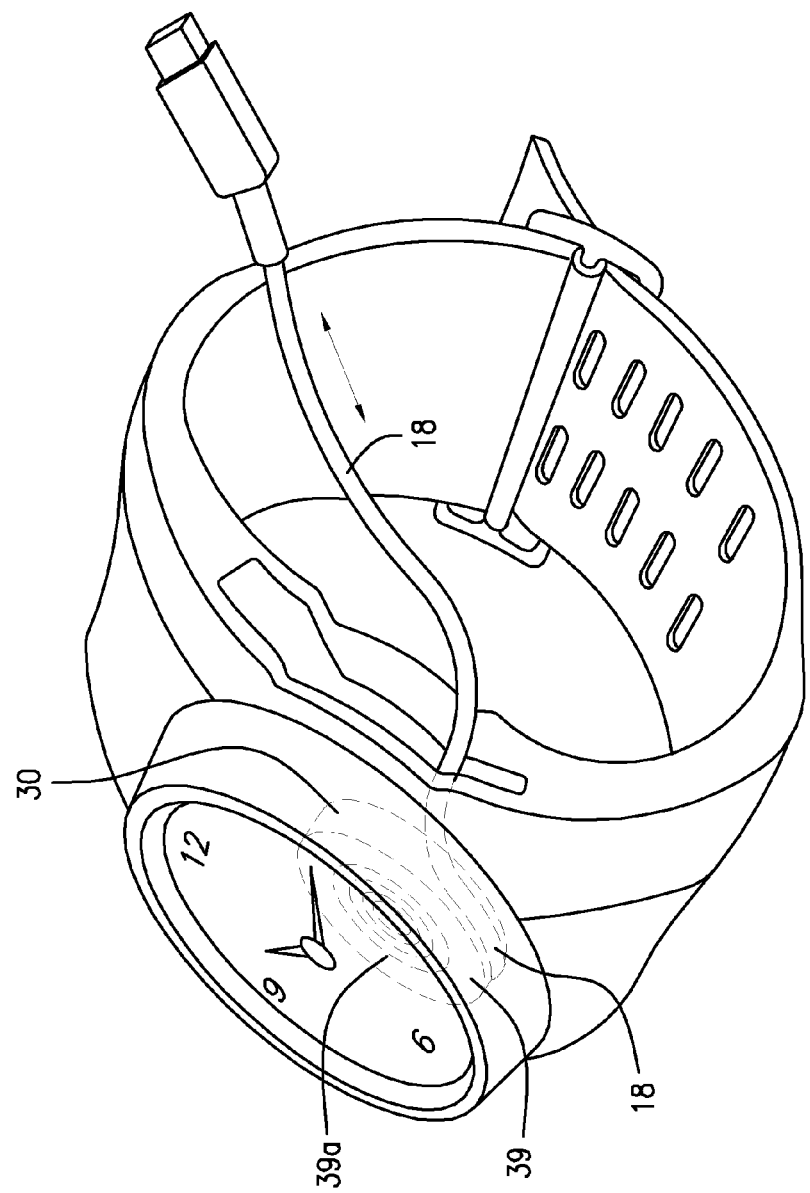
FIG. 4 shows a reeling mechanism for the embodiment of FIG. 3.
Figure 4A:
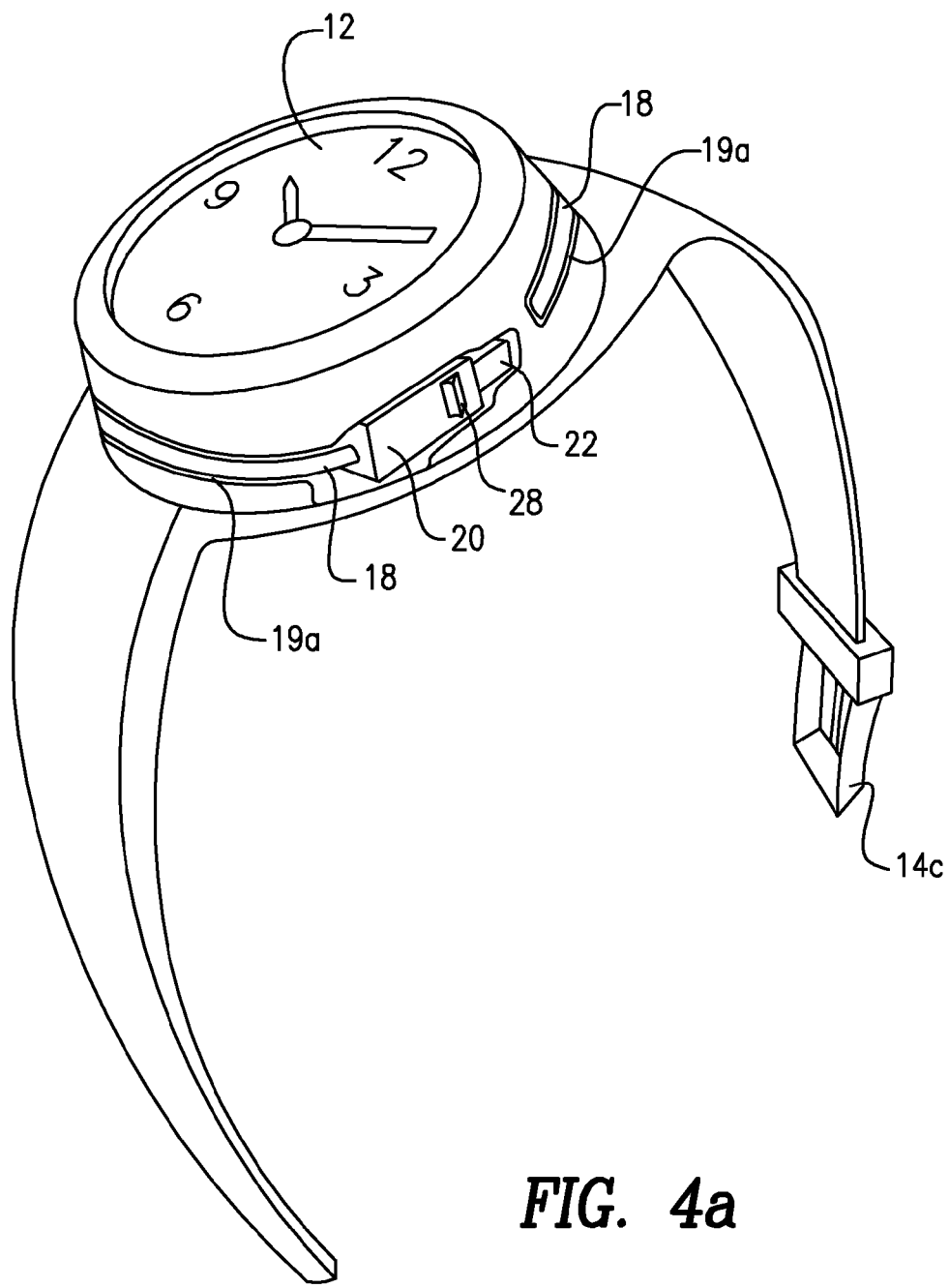
FIG. 4a shows an outer reel.

In the embodiment of FIG. 4, there is disclosed a reeling mechanism 39 which comprises an internal leaf spring 39a which dispenses with the need of having to manually reel the cable 18. An embodiment with an outer reel on which the cable 18 is wound in an annular groove 19a is shown in FIG. 4a.

In the embodiment in accordance with FIGS. 5 and 6, a unique watch band 40 is provided which defines a cavity for the removable insertion of the watch movement 11 and watch dial 12. Also located within the body of the watch band 40 is an internal battery 30, which is connected via the flexible cable 18 to the plug body 20 and battery charger plug 22. To prevent the cable 18 from dangling loosely, a groove 42 is cut on the inside face of the watchband, in which the cable can be squeezed into, to be held firmly with the plug body 20 and charging plug 22 being housed in the nestling space 24a.

The embodiments of FIGS. 7 and 8 are very similar to the embodiments shown in FIGS. 5 and 6, except for storage groove 43 for the cable 18 being defined in the side edge of the thickness of the band 40. The opening or well 17 is suited to removably receive therein a watch movement, as previously described.

Figure 11:
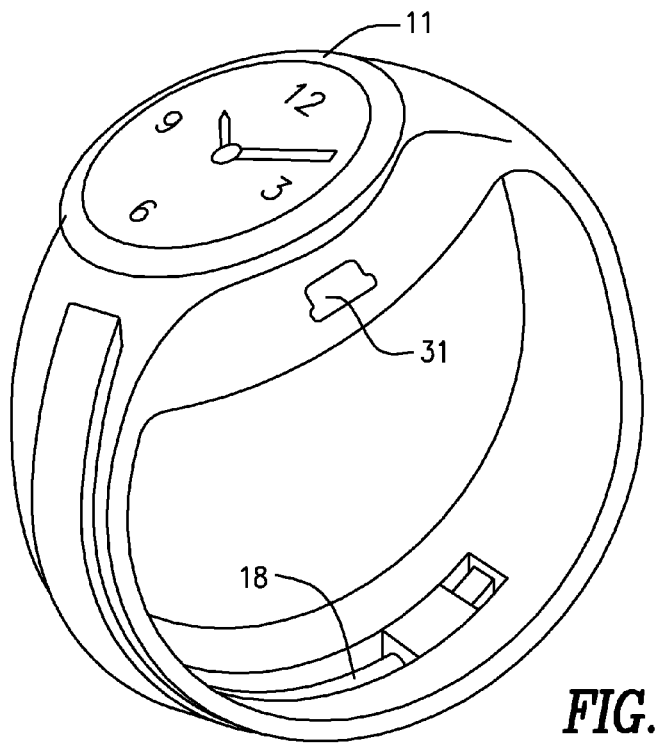
FIGS. 11 and 12 show yet another embodiment of storing the power cable.
Figure 12:
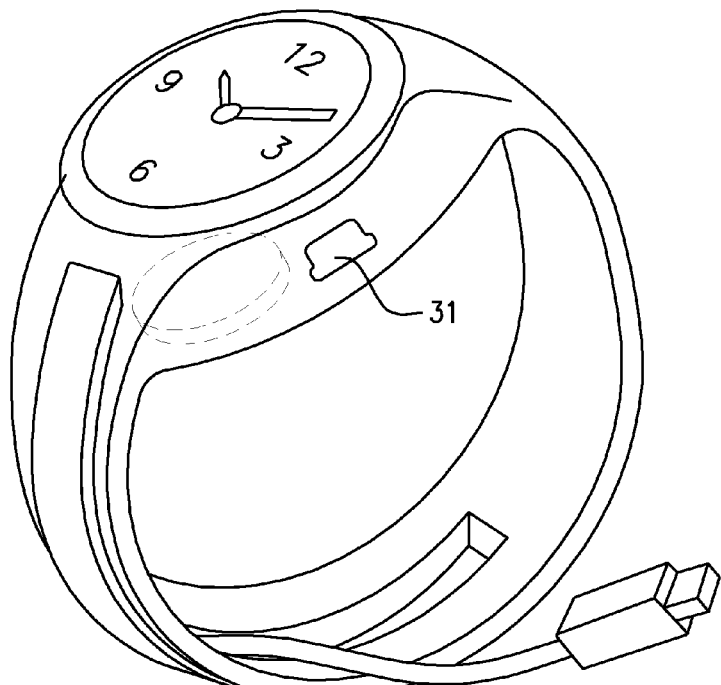

In accordance with the embodiment illustrated in FIGS. 9 and 10, the cable 18 is stored by being snaked in and out of grooves 45 defined in the links 47 of the watchband. One of the links comprises the housing of a battery 30a, while another of the links 45a provides a housing for the watch. Another of the links, 45b, defines a charging port in which a standardized conventional charger can be plugged in to charge the battery 30a. A still further variant for storing the cable 18 in the band and providing a charging port 31 for the internal battery illustrated in FIGS. 11 and 12.

Figure 13:
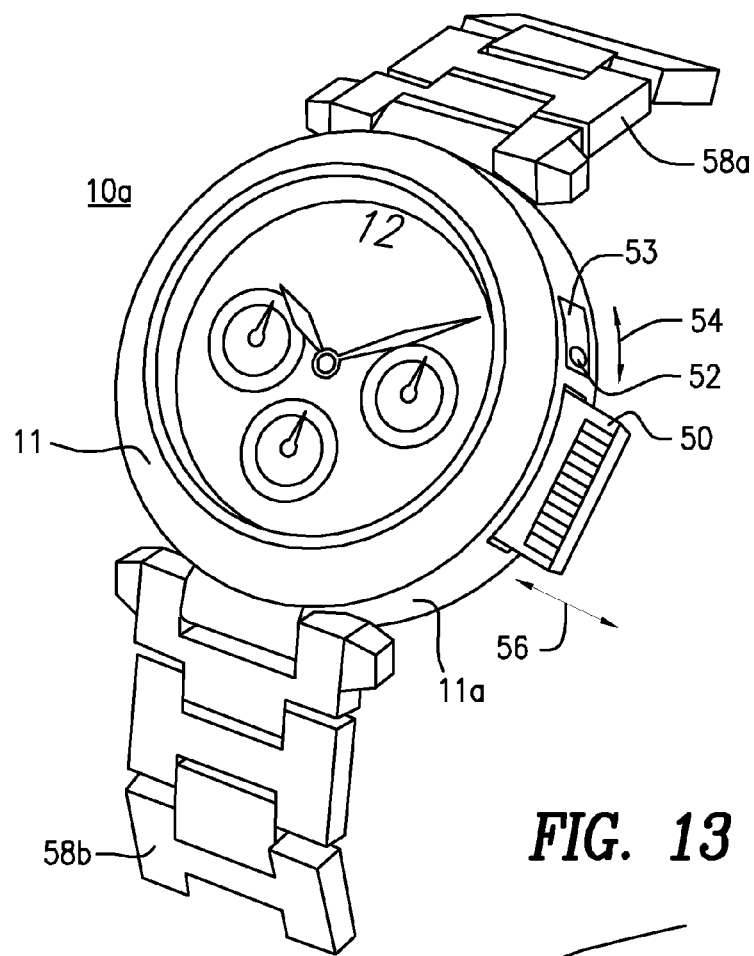
FIGS. 13 and 13a show an embodiment of a power plug that is slidable in and out of the watch assembly housing.
Figure 13A:
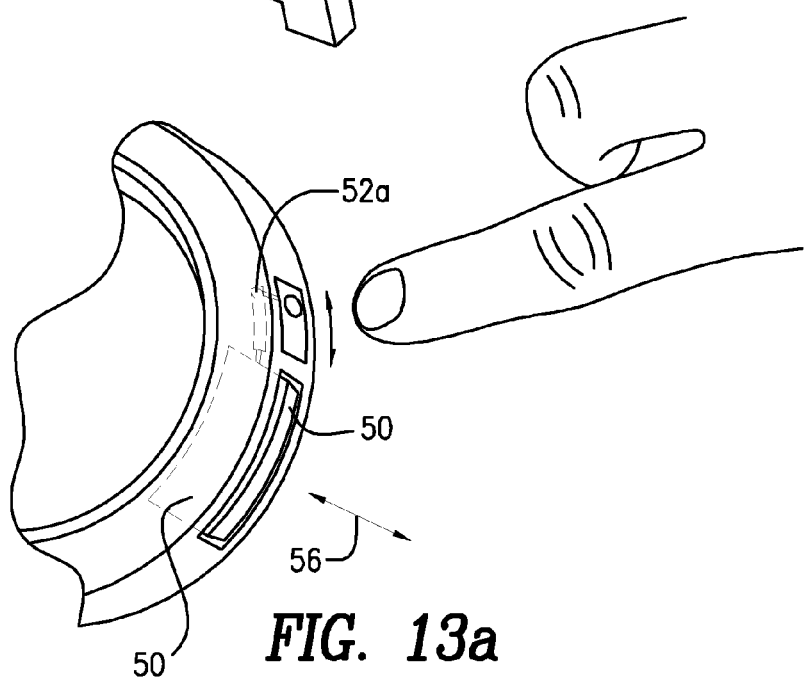

The embodiments of FIGS. 13 through 16a dispense with the need of providing the extendable cable 18 and the storage thereof. Referring first to FIGS. 13 and 13a, the charging plug 50 is slidable in an out of the lower portion of the watch case 11a located below the watch movement 11, in the directions of arrows 56. Thus, a button 52 connected to a linkage mechanism 52a (FIG. 13a) translates the lateral movement of the button 52 in the slot 53 along the peripherally extending arrow 54 into a radial movement of the charging plug 50 into and out of the battery assembly 11a.

Figure 14:
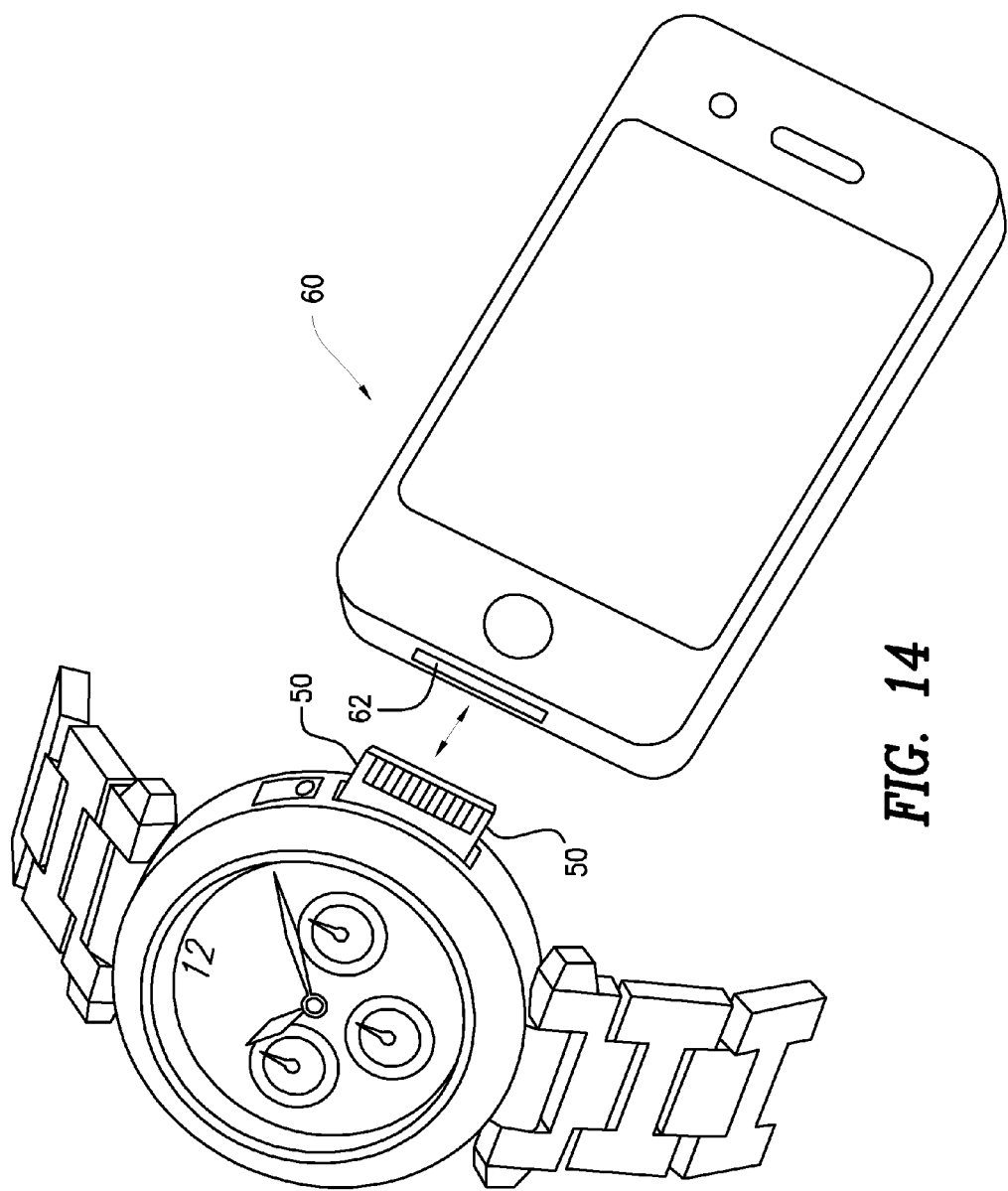
FIG. 14 illustrates a mode of connecting a cellular device to the spare battery.

In the foregoing embodiment, the watch assembly 10a secured to a wrist by watchbands 58a and 58b can be taken off the hand and connected to the mobile device 60 shown in FIG. 14 by being inserted into the charging female connector 62 thereof. Alternatively, the watch movement may be placed on the palm side of the wrist, while the phone is held in one's palm, so there is no need to remove the watch assembly from the hand while the phone device is being used. See FIG. 14.

Figure 15:
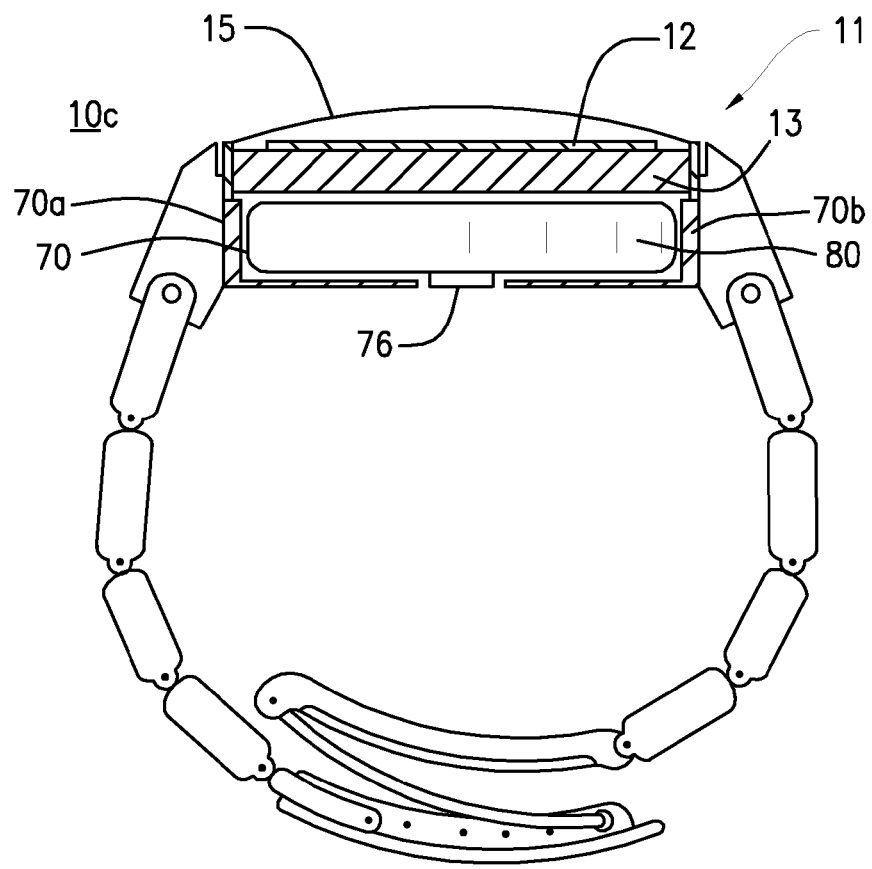
FIGS. 15 and 15a show a further embodiment wherein the watch assembly comprises a lower chamber in which a spare battery can be stored and retrieved from for use with a cellular device.
Figure 15A:
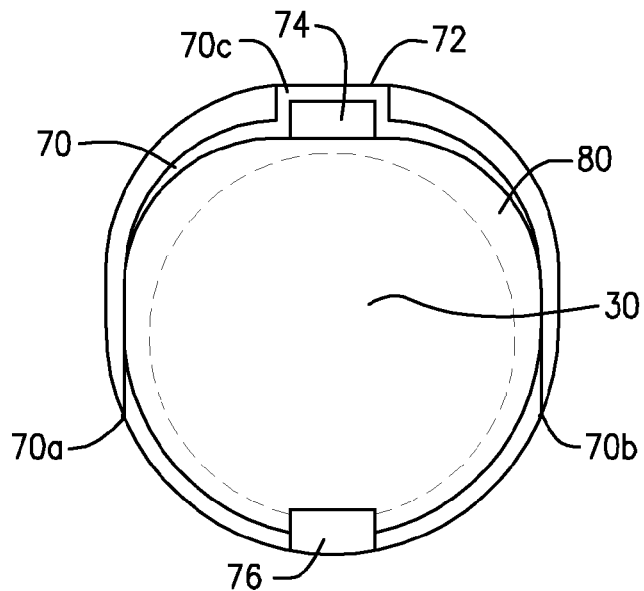

Turning to FIGS. 15 and 15a, the watch assembly 10c comprises an upper compartment for a watch movement 11 and its internal mechanism 13, and a watch dial 12 covered by a crystal 15. Located within a special battery assembly compartment 70 is the battery assembly 80 which has at its bottom a catching tab 76, allowing the entire battery assembly 80 to be dragged out from the watch assembly 10c, so that it can be connected directly to a telephone after it has been removed from the watch assembly.

Thus, as shown in FIG. 15a, the battery assembly 80 comprises an internal battery 30 surrounded by a housing which provides at one end has the male charging plug 74 which is in all respects identical to the charging plug 22 previously described. The assembly 80 fits in the chamber 70 which is substantially open at one side and which the opening thereof has terminal ends at 70a and 70b which allows the entire battery assembly, together with its plug, to be withdrawn from within the watch and directly attached to the telephone device. The contour of the battery assembly 80 is such that it is narrow enough to be withdrawn to the opening between the edges 70a and 70b. Within the battery compartment 70, is a special storage location 90c for the male plug 74. Again, in this embodiment the entire battery assembly is withdrawn by engaging with a finger or, more specifically, the nail, the projection 76, withdrawing the battery assembly and inserting it into the charging port of the cellular device to provide even greater freedom of operation and usage of the spare battery 30.

Figure 15B:
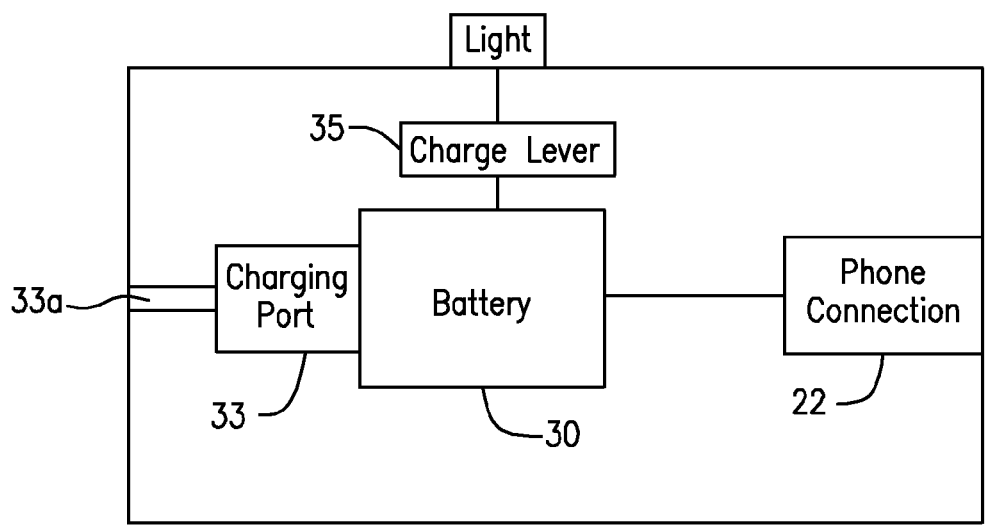
FIG. 15b is a diagram of the spare battery and connector system.

FIG. 15b is just a generalized diagram showing the battery 30 connected via an electrical line affixed to the phone charger plug 22 and which also has a charging port 32 which is accessible through one side to a suitable plug 33a, so that the battery 30 itself can be recharged. The low charge level block 35 turns on the aforementioned indicator light which alerts the user that the spare battery requires recharging.

Figure 16:
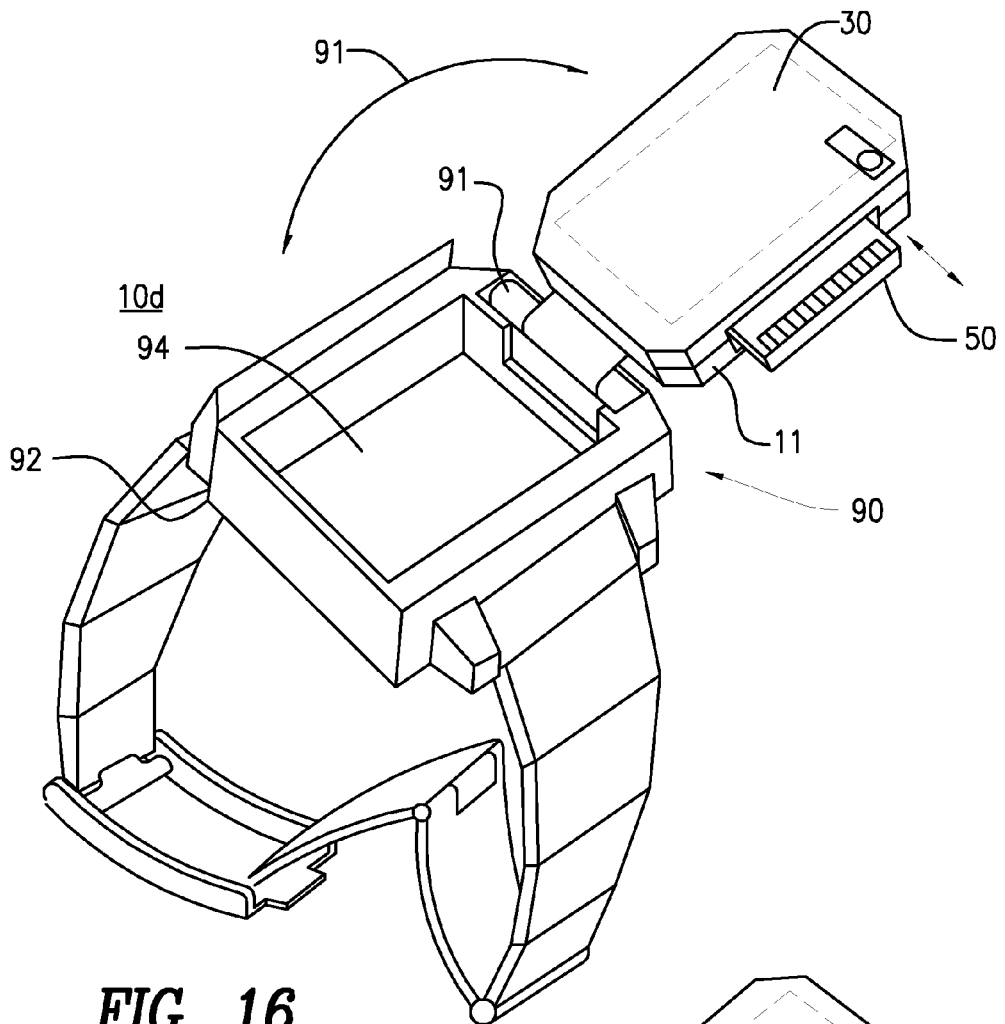
FIGS. 16 and 16a show another embodiment of a watch assembly with a watch movement and spare battery that can be pivoted in and out of the main housing of the watch.
Figure 16A:
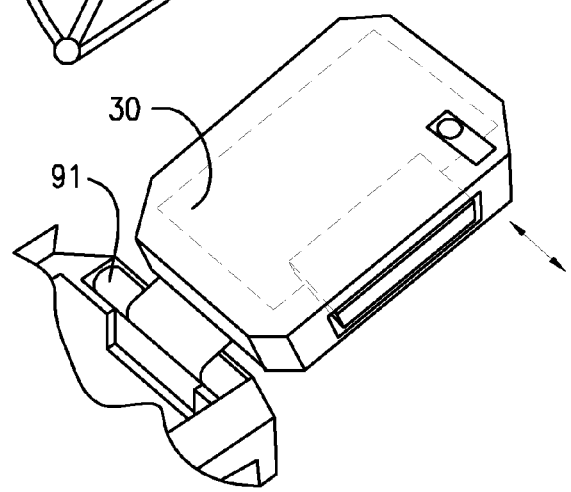

In a further embodiment, as shown in FIGS. 16 and 16a, the entire watch movement 11 and battery assembly 30 are pivotably attached to the watch assembly at a hinge 91 located to one side of the watch body 90, which defines a well 94. Thereby, upon sliding the male plug 50 inside the battery compartment, one can pivotly insert the entire construction into the well 94, providing no outwardly visible indication of the existence of the spare battery inside the watch assembly. Thus, in its stowed position, only the watch dial is visible. As indicated by FIG. 16a, the hinge can be only partially wrapped around the axis 91, so that the entire assembly consisting of the watch and assembly can be connected directly to the telephone without a need to remove the watch assembly and its band from one's wrist. Although in FIGS. 16 and 16a the charging plug 15 shown slides in and out of the package, it is easily arrangeable that the plug can be stationarily provided and arranged to pivot into and out of the well 94, greatly increasing ease of use and reducing mechanical complexity.

Note that the battery assembly described herein may be about 20-25 mm in length and width and on the order of about 5-10 mm, even as low as 4 mm in thickness.

As described above, instead of having to carry the aforementioned charger, the present invention provides the battery stored in the watch and thus always available, and not likely to be left behind or forgotten.

The invention as described makes it possible to easily carry a spare battery and its combination with the watch presents an aesthetically appealing as well as convenient way to have the spare watch at all times into which the mobile phone can be just plugged in to obtain extra battery time for operating the mobile device.

In regards to the watch assembly herein, there are several ways for the watch assembly to work:
  Have the time piece as a separate piece with a separate battery just for the watch;
  Connect the watch time piece to the main lithium battery and use the battery for both (for watch and for charging phones); or
  Make the time piece solar so it doesn't need an extra battery for the watch.

Regardless, in all embodiments, the watch movement has to be configured to allow replacement of the watch movement battery. The watch assembly herein, to be known as the Juice Watch, is the world's first emergency back-up battery solution for all mobile devices, using micro components and a small, energy dense lithium-ion battery that fits in a watch. The Juice Watch is designed to provide around 1 or 2 hours of extra talk time. The Juice Watch is a great carry-able charging product with a built-in battery and cable cord (to connect to phone) for all smart phones: iPhone, Samsung Galaxy, Android, HTC, Motorola, LG, Razor, Blackberry, and many more phones and devices. The Juice Watch is a Universal battery pack that can be used all over the world.

The Juice Watch is perfect for all age groups. The market for teenagers is in high demand because most of the kids these days have smart phones and they are using the battery up quickly (from talking, texting, Internet, games, movies) and this is a perfect product for them if it is designed as gadgetry with many colors for guys and girls and has a decent price they can afford. The market for the average person can be in high demand because billions of people have mobile phones and using the battery up quickly. The charging products on the market now are very expensive (between $50 to $120 for battery case or similar charging products) and a lot of people prefer not to buy a battery case and have to carry an extra thick case on their phone. Others like the actual phone design and don't want to cover it with any case so the combination of a juice battery in a nice designed watch can be perfect product for them.

As noted, anytime the battery is low, one can just pull out the cable connector from the watch assembly and plug it into the phone to get extra battery time and keep using the phone. It is designed for all smartphones, i-Pod, i-Pad Video game machine, MP3, etc. It comes with a rechargeable 600 mAh Lithium ion battery. The Juice Watch design provides different connector pin configurations:
  For any Apple products iPhone/iPod with an Apple pin connector.

For any Mobile phones with a Micro USB pin connector such as; Samsung Galaxy, Blackberry, Android, LG, Motorola and more.

The Juice Watch has a female Micro-USB port to recharge the battery in the watch with minimum of a 500 recycles.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A watch assembly, comprising:
a watch housing having at least one wrist strap, a watch movement and a watch display, the watch housing being configured to hold and support the watch movement;
a spare battery assembly physically supported by the watch housing and including therein a rechargeable spare battery able of storing electrical charge to run a mobile auxiliary communication device not associated with the watch assembly; and
a charging plug connected to and constituting part of the spare battery assembly, the charging plug being configured to fit a predetermined charging port of the mobile auxiliary device and the spare battery assembly the spare battery assembly is electrically isolated from the watch movement and watch display.

2. The watch assembly of claim 1, including a flexible cable tethering the charging plug to the spare battery.

3. The watch assembly of claim 2, including a plurality of links forming a watchband for donning the watch assembly on a person's wrist, the links having grooves defined therein for the storage of the flexible cable.

4. The watch assembly of claim 2, including a reeling mechanism in the battery assembly and configured to reel the cable into the watch assembly.

5. The watch assembly of claim 4, wherein the reeling assembly is spring loaded.

6. The watch assembly of claim 4, including a rotable reeling knob which is manually rotatable to reel the cable into the watch assembly.

7. The watch assembly of claim 2, including a watchband and the watchband comprising a storage groove defined therein in which the cable can be stowed.

8. The watch assembly of claim 7, wherein the storage groove is defined in an edge surface of the watchband.

9. The watch assembly of claim 1, wherein the charging plug is mounted to the watch assembly to slide into and out of the battery assembly.

10. The watch assembly of claim 1, including a charging port for the battery assembly.

11. The watch assembly of claim 10, including an LED indicator for indicating a low charge state of the battery within the battery assembly.

12. The watch assembly of claim 1, wherein the plug is removably attached and replaceable with another charging plug which is configured according to a different standardized plug to be able to be inserted into the charging port of a different auxiliary device.

13. The watch assembly of claim 1, including a separate battery assembly chamber located below the watch movement, the chamber being provided with an opening therein which is large enough to insert and remove therethrough the battery assembly in its entirety, in a manner that permits the battery assembly to be withdrawn from the chamber and to be attached directly via the plug thereof to the auxiliary mobile device.

14. The watch assembly of claim 13, wherein the plug position is fixed relative to the battery assembly.

15. The watch assembly of claim 1, wherein the housing defines a well which is configured to removably receive therein the entirety of both the watch assembly and the rechargeable battery assembly.

16. The watch assembly of claim 15, wherein the watch assembly and the battery assembly are secured to the watch assembly by a hinge mechanism which allows the watch movement and the battery assembly to inwardly pivot toward and away from the well.

17. The watch assembly of claim 16, wherein the watch movement and the spare battery assembly can be disengaged from the watch assembly at the hinge mechanism.

18. The watch assembly of claim 16, wherein in the stowed position, the battery assembly is located substantially entirely within the well and is not visible from the exterior of the watch assembly.

19. The watch assembly of claim 1, wherein the battery is a lithium ion battery of a size and charge capacity to store therein at least 600 mAh of charge.

20. A watch assembly, comprising: a watch housing having at least one wrist strap, a watch movement and a watch display, the watch housing being configured to hold and support the watch movement; a spare battery assembly physically supported by connected to the watch housing and including therein a rechargeable spare battery able of storing electrical charge to run a mobile auxiliary communication device not associated with the watch assembly; and a charging plug connected to and constituting part of the spare battery assembly, the charging plug being configured to fit a predetermined charging port of the mobile auxiliary mobile device and the spare battery assembly not being associated or configured to power the watch assembly, such that the spare battery is electrically isolated from the watch movement and watch display.

* * * * *